United States Patent
Tanaka et al.

(10) Patent No.: US 8,243,950 B2
(45) Date of Patent: Aug. 14, 2012

(54) TELECONFERENCING APPARATUS WITH VIRTUAL POINT SOURCE PRODUCTION

(75) Inventors: Ryo Tanaka, Hamamatsu (JP); Takuya Tamaru, Hamamatsu (JP); Katsuichi Osakabe, Hamamatsu (JP)

(73) Assignee: Yamaha Corporation (JP)

( * ) Notice: Subject to any disclaimer, the term of this patent is extended or adjusted under 35 U.S.C. 154(b) by 1122 days.

(21) Appl. No.: 12/067,286

(22) PCT Filed: Nov. 1, 2006

(86) PCT No.: PCT/JP2006/321913
§ 371 (c)(1),
(2), (4) Date: Mar. 18, 2008

(87) PCT Pub. No.: WO2007/052726
PCT Pub. Date: May 10, 2007

(65) Prior Publication Data
US 2008/0285771 A1    Nov. 20, 2008

(30) Foreign Application Priority Data

Nov. 2, 2005 (JP) ................................. 2005-320042

(51) Int. Cl.
*H04R 3/00* (2006.01)
(52) U.S. Cl. .......................................... 381/92; 381/94.1
(58) Field of Classification Search .............. 381/66, 381/91–94, 94.1
See application file for complete search history.

(56) References Cited

U.S. PATENT DOCUMENTS

| | | | |
|---|---|---|---|
| 5,335,011 A | 8/1994 | Addeo et al. | |
| 7,254,537 B2 * | 8/2007 | Otani et al. | 704/233 |
| 2002/0001389 A1 | 1/2002 | Amiri et al. | |
| 2003/0236887 A1 | 12/2003 | Kesselman et al. | |
| 2005/0207566 A1 * | 9/2005 | Ohki et al. | 379/406.01 |
| 2005/0254640 A1 * | 11/2005 | Ohki et al. | 379/406.1 |
| 2010/0165071 A1 * | 7/2010 | Ishibashi et al. | 348/14.08 |
| 2011/0121965 A1 * | 5/2011 | Betts et al. | 340/539.13 |

FOREIGN PATENT DOCUMENTS

| | | |
|---|---|---|
| JP | 2-114799 A | 4/1990 |
| JP | 8-505745 A | 6/1996 |
| JP | 9-121400 A | 5/1997 |
| JP | 9-261351 A | 10/1997 |
| JP | 11-304906 A | 11/1999 |
| JP | 2005-136701 A | 5/2005 |

OTHER PUBLICATIONS

Extended European Search Report issued in corresponding EP 06822833.7 dated Apr. 7, 2011.
International search report issued in corresponding application PCT/JP2006/321913, dated Feb. 20, 2007.

* cited by examiner

*Primary Examiner* — Nathan Ha
(74) *Attorney, Agent, or Firm* — Rossi, Kimms & McDowell LLP

(57) ABSTRACT

A teleconferencing apparatus includes the functions of a transmitting unit and a receiving unit and the transmitting unit transmits a sound signal formed from sound pick-up signals of a microphone array made up of microphones Mi (i=1 to N) and position information. The position information is provided by forming a plurality of sound pick-up beams directed in a specific direction and selecting the sound pick-up beam with the largest volume. In the receiving unit, a parameter calculation section sets a virtual sound source based on data of a reception signal and sets a delay parameter. A virtual sound source generation signal processing section forms a sound emission beam based on the parameters and outputs the beam to a loudspeaker SPi.

6 Claims, 8 Drawing Sheets

TRANSMIT ACQUIRED SOUND AND POSITION INFORMATION

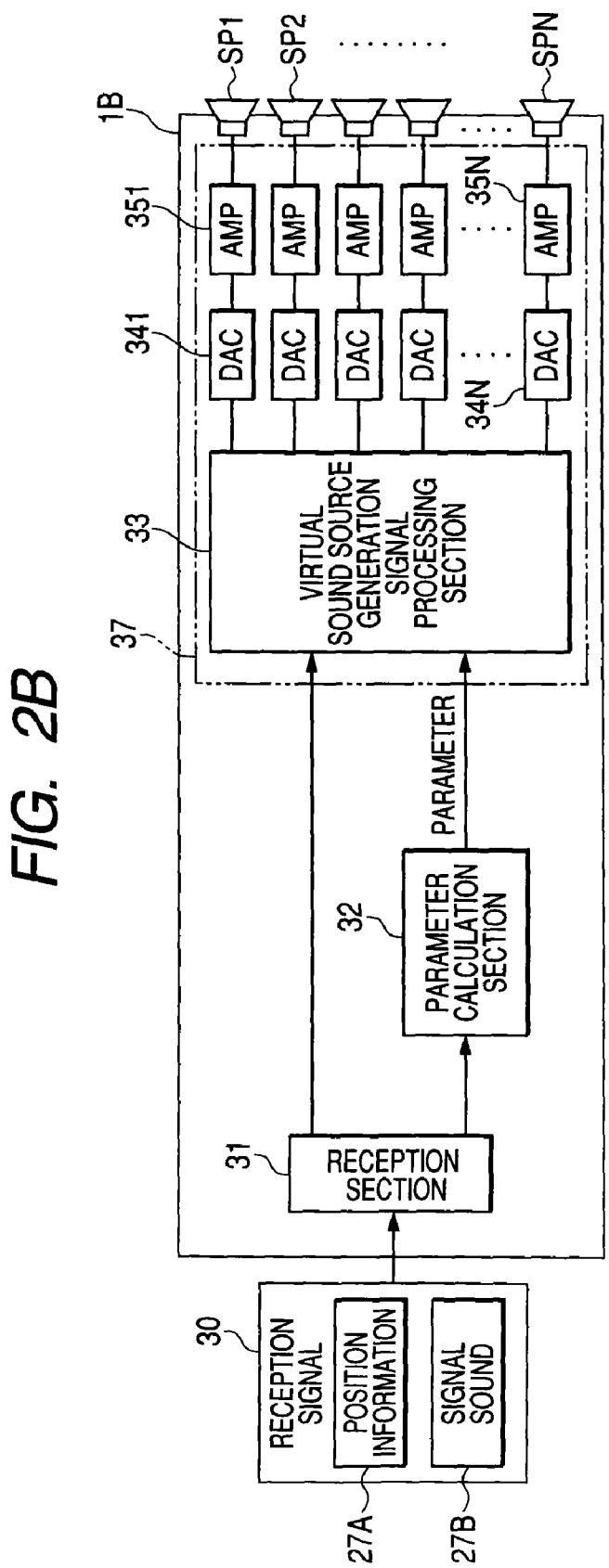

| LOUDSPEAKER | DELAY AMOUNT SETTING |
|---|---|
| SP1 | DISTANCE 361/V |
| SP2 | DISTANCE 362/V |
| . . . | . . . |
| SPN | DISTANCE 36N/V |

TELECONFERENCING APPARATUS WITH VIRTUAL POINT SOURCE PRODUCTION

This application is a U.S. National Phase Application of PCT International Application PCT/JP2006/321913 filed on Nov. 1, 2006, which is based on and claims priority from JP 2005-320042 filed on Nov. 2, 2005. The contents of the PCT and the priority application, in their entirety, are incorporated herein by reference.

TECHNICAL FIELD

This invention relates to a teleconferencing apparatus for transmitting sound together with position information and reproducing the received sound and its sound field.

BACKGROUND ART

Hitherto, teleconferencing apparatus for receiving sound at the transmitting party and reproducing a sound field of the sound at the transmitting party have been proposed (refer to patent documents 1 and 2).

Patent document 1 discloses the following apparatus: A microphone picks up sound of a speaker, speaker position information is formed according to speaker information obtained from the microphone, and the speaker position information and sound information are multiplexed for transmission. The position of the loudspeaker to be sounded is switched according to the sent speaker position information at the receiving party and the sound and position of the speaker are reproduced at the receiving party.

Patent document 2 discloses a creation method, etc., of stereophonic sound information for transmitting sound information received with a plurality of microphone arrays and outputting the sound information to as many loudspeaker arrays as the number of the microphone arrays, thereby reproducing a sound field of the transmitting source.

Patent document 1: JP-A-9-261351
Patent document 2: JP-A-2-114799

DISCLOSURE OF THE INVENTION

Problems to be Solved by the Invention

However, in patent document 1, an auditory localization method of reproduced sound is based on adjustment with only the volume balance of loudspeakers and thus it is difficult to perform accurate auditory lateralization.

In patent document 2, the sound filed information received with a plurality of microphone arrays is output as it is. Thus, the method has the disadvantage of consuming many transmission line recourses because signals of as many channels as the number of the loudspeaker arrays must be transmitted to a remote location although a natural sound can be output.

It is therefore an object of the invention to precisely reproduce the sound field of the transmitting part at the destination while suppressing consumption of the transmission line resources by outputting a sound signal to a loudspeaker array based on received sound source position information in an apparatus for reproducing the sound field of the transmitting party of the destination.

Means for Solving the Problems

The invention implements means for solving the problems described above as follows:

(1) The invention is characterized by the fact that an apparatus includes:
a microphone array with a plurality of microphones each for picking up sound and outputting a sound pick-up signal, placed like an array;
a sound pick-up beam forming section for delaying and adding the sound pick-up signals output from the microphones, to form sound pick-up beams directed to a plurality of sound pick-up areas;
a position information detector for detecting, as position information, the sound pick-up area corresponding to the sound pick-up beam showing the largest volume among the sound pick-up beams;
transmission means for transmitting the output of the sound pick-up signal of the microphones and the position information;
a loudspeaker array with a plurality of loudspeakers placed like an array;
a reception section for receiving an external sound signal and external position information; and
a signal processing section for processing the received sound signal so as to form a sound emission beam with the position determined based on the received position information as a virtual sound source position and supplying the signal to the loudspeakers.

The apparatus of the invention includes the function of one apparatus to mutually connect two or more teleconferencing apparatus through a communication line and a network. That is, it includes a receiving unit and a transmitting unit.

In the transmitting unit, the sound source position information detector detects the position of the sound source and the microphone picks up a sound signal of the sound source and converts the sound into an electric signal.

The sound source position information detector forms sound pick-up beams directed to positions from the sound pick-up signals of the microphones and detects the position of the sound pick-up area of the sound pick-up beam from the largest volume of the sound pick-up beams as position information of the speaker. The transmission section transmits the sound signal obtained with the microphone array and the position information.

In the receiving unit, the reception section receives a sound signal of a sound source and position information of the sound source from an associated apparatus. The signal processing section processes the received sound signal so as to form a sound emission beam with the position determined according to the received position information of the sound source as the virtual sound source position in the rear of the loudspeaker unit and supplies the signal to the loudspeaker unit. For example, the coordinates of the virtual sound source can be on a coordinate axis plane with the center of the apparatus as the origin and the rear direction as the Y axis.

One of the two teleconferencing apparatus has been described; a similar description also applies to sound pick-up and sound emission of sound signal and positional relationship in the opposite direction.

The configuration of the invention enables the conference participators to interact with each other in the real positional relationship as if they interacted with the virtual sound source of the conference room of the associated apparatus provided on the opposite side with the teleconferencing apparatus between. Since the position information of the sound source is received together with the sound signal of the sound source, the disadvantage of consuming many transmission line recourses as in patent document 2 can be eliminated. The need for limiting the numbers of loudspeakers at the transmitting party and loudspeakers at the receiving party to the same number as in patent document 2 is eliminated.

The output of the sound pick-up signal of the microphone transmitted by the transmitter may be the sound pick-up signal of the microphone; it may be any one of microphone sound signals of sound sources or a signal provided by combing microphone sound signals of sound sources (for example, simply adding), may be output of a sound pick-up beam provided by delaying and adding sound pick-up signals from microphones, or may be provided by combining sound pick-up beams.

(2) The invention is characterized by the fact that the position information detector detects the sound pick-up area of the sound pick-up beam showing the largest volume and then forms acquisition sound pick-up beams directed to a plurality of fragmented sound pick-up areas into which the sound pick-up area is further fragmented, and detects the position information based on the fragmented sound pick-up areas corresponding to a plurality of acquisition sound pick-up beams selected in the descending order of the volume values of the acquisition sound pick-up beams.

In the configuration, the position information detector forms acquisition sound pick-up beams directed to fragmented sound pick-up areas and selects the sound pick-up beams with a large volume, so that a search can be made for finer areas as position information. In the configuration, sound pick-up areas are narrowed down in two steps for selection without forming sound pick-up beams to fine areas from the beginning for selection. Therefore, the number of sound pick-up beams to be formed can be lessened, so that the hardware used for the position information detection means can be simplified.

(3) The invention is characterized by the fact that the position information is detected by prorating the fragmented sound pick-up areas corresponding to the acquisition sound pick-up beams selected in the descending order of the volume values of the acquisition sound pick-up beams in response to the intensity of the selected acquisition sound pick-up beams, and that the signal processing section combines outputs of the selected acquisition sound pick-up beams by the prorating.

In the configuration, the position information is detected by prorating the selected fragmented sound pick-up areas in response to the intensity of the selected acquisition sound pick-up beams, so that the intermediate portion of the fragmented sound pick-up areas can be interpolated and higher-accuracy position information can be provided. Since the signal processing section combines outputs of the selected acquisition sound pick-up beams based on the prorating, the intermediate portion of the sound pick-up area of each sound pick-up beam can be interpolated. As interpolation is thus always executed in balance, if the sound source moves, the sound pick-up beam can be switched smoothly.

Advantages of the Invention

According to the invention, the conference participators can interact with each other in the real positional relationship as if they interacted with the virtual sound source of the conference room of the associated apparatus provided on the opposite side with the teleconferencing apparatus between.

BRIEF DESCRIPTION OF THE DRAWINGS

FIG. 2B is a block diagram of a receiving party of the transmitting party to represent the internal configuration of the teleconferencing apparatus used for voice communications of the embodiment of the invention.

BEST MODE FOR CARRYING OUT THE INVENTION

Figure 1A:
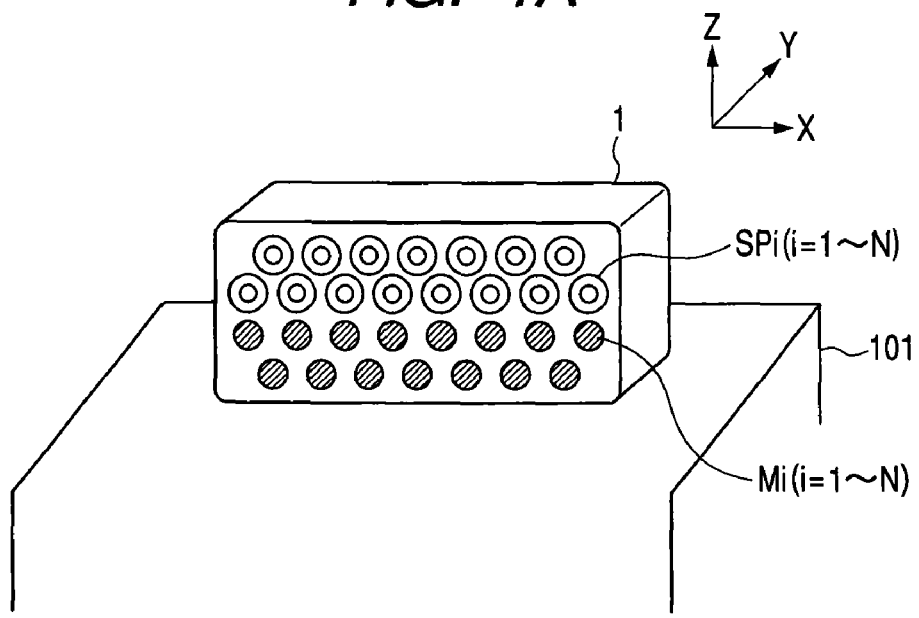
FIG. 1A is an external view of a teleconferencing apparatus used for voice communications of an embodiment of the invention.
Figure 1B:
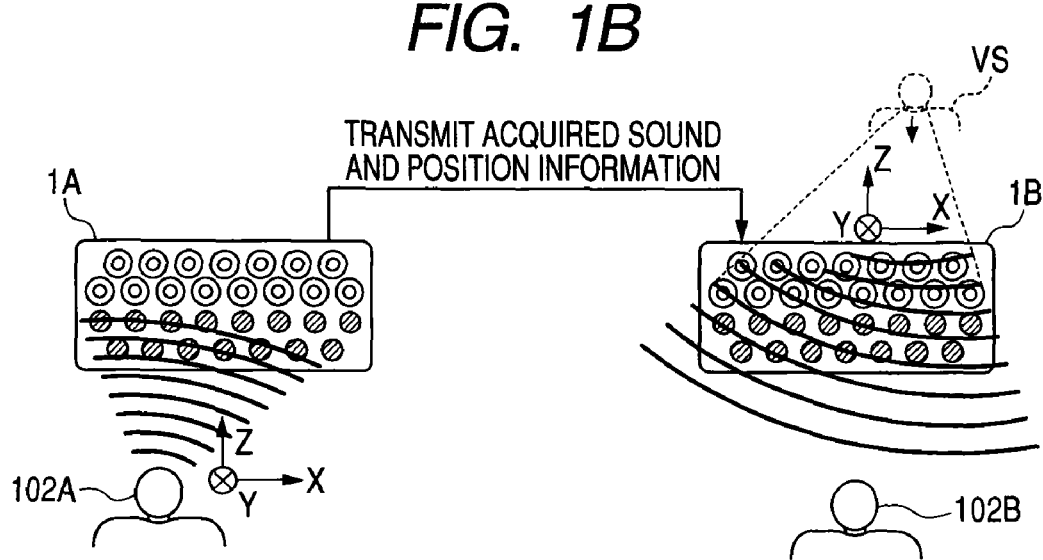
FIG. 1B is a schematic functional drawing of the teleconferencing apparatus.

A teleconferencing apparatus used for voice communications of an embodiment of the invention will be discussed with FIG. 1. FIG. 1A is an external view of the teleconferencing apparatus used for voice communications of the embodiment of the invention, and FIG. 1B is a schematic functional drawing.

To begin with, the configuration of a teleconferencing apparatus 1 will be discussed with FIG. 1A. As shown in FIG. 1A, the teleconferencing apparatus 1 includes a loudspeaker array made up of a plurality of loudspeakers SPi (i=1 to N; N is an integer) and a microphone array made up of a plurality of microphones Mi (i=1 to N) on appearance, and is installed on a desk 101, for example. Two teleconferencing apparatus installed at remote locations are connected by a communication line and conduct voice communications with each other.

The loudspeakers SPi (i=1 to N) making up the loudspeaker array are connected to a sound processing system that can process sound signals independently, and can perform sound output independently. The microphones Mi (i=1 to N) making up the microphone array can convert sound output into digital data independently. A coordinate system X, Y, Z is described later.

Next, a functional outline of the teleconferencing apparatus 1 will be discussed with FIG. 1B. As shown in the left drawing of FIG. 1B, to transmit sound, a speaker 102A at the transmitting party speaks toward the teleconferencing apparatus 1. Then, in a transmitting unit 1A, the microphones Mi (i=1 to N) making up the microphone array pick up the sound, the position of the speaker 102A at the transmitting party is detected based on the picked-up sound, and a picked-up sound signal and position information are transmitted. A plurality of patterns of sound pick-up beams provided by setting a delay in each picked-up electric signal and combining the signals (namely, performing delay addition) are formed and the position information is calculated from the intensity of the patterns. The coordinate system of the position information can be given as XYZ axis coordinate system, for example, as shown in FIG. 1A and FIG. 1B. Specifically, in the XYZ axis coordinate system, with respect to the sound reception plane of the teleconferencing apparatus 1, the up and down direction is a Z axis, the side-to-side direction is an X axis, and the depth direction perpendicular to the sound reception plane is a Y axis. It is also possible to give the coordinate system as polar coordinates of distance R and angle θ from the center of the sound reception plane in place of the X axis direction and the Z axis direction.

As shown in the right drawing of FIG. 1B, at the receiving party of the teleconferencing apparatus 1, a receiving unit 1B calculates the position of a virtual sound source VS based on the transmitted sound signal and position information, calculates the delay amount to the signal to be output to each loudspeaker SPi, gives a delay to sound spoken at the transmitting unit 1A, and outputs the signal to the loudspeaker SPi. Accordingly, the sound field of the sound spoken at the transmitting unit 1A is accurately reproduced and the sound field at the transmitting party is sent to a listener 102B at the receiving party. Since it is natural to place the virtual sound source VS at a position opposed to the listener 102B at the receiving party speaking toward the receiving unit 1B, the X axis coordinate in the side-to-side direction and the Y axis coordinate in the depth direction with respect to the listener 102B at the receiving party are set so that the values actually obtained in the transmitting unit 1A and the coordinate values to set a virtual position in the receiving unit 1B become reverse in positive and negative. Similar comments also apply when the polar coordinates mentioned above are used.

In the description of FIGS. 1A and 1B, different reference symbols are used to conceptually distinguish the transmitting unit 1A and the receiving unit 1B from each other; in fact, however, the teleconferencing apparatus 1 of the embodiment can conduct bidirectional communications and the listener 102B at the receiving party can also transmit sound to the speaker 102A at the transmitting party through the microphone array of the receiving unit 1B. That is, each teleconferencing apparatus includes the transmitting unit 1A and the receiving unit 1B in FIG. 1B in one piece.

In the embodiment, as the sound transmitted by the teleconferencing apparatus 1, a voice is taken as an example, but the target of the apparatus 1 of the embodiment is not limited to the voice. For example, the sound may be music, etc. Same comments apply to the description to follow.

Figure 5A:
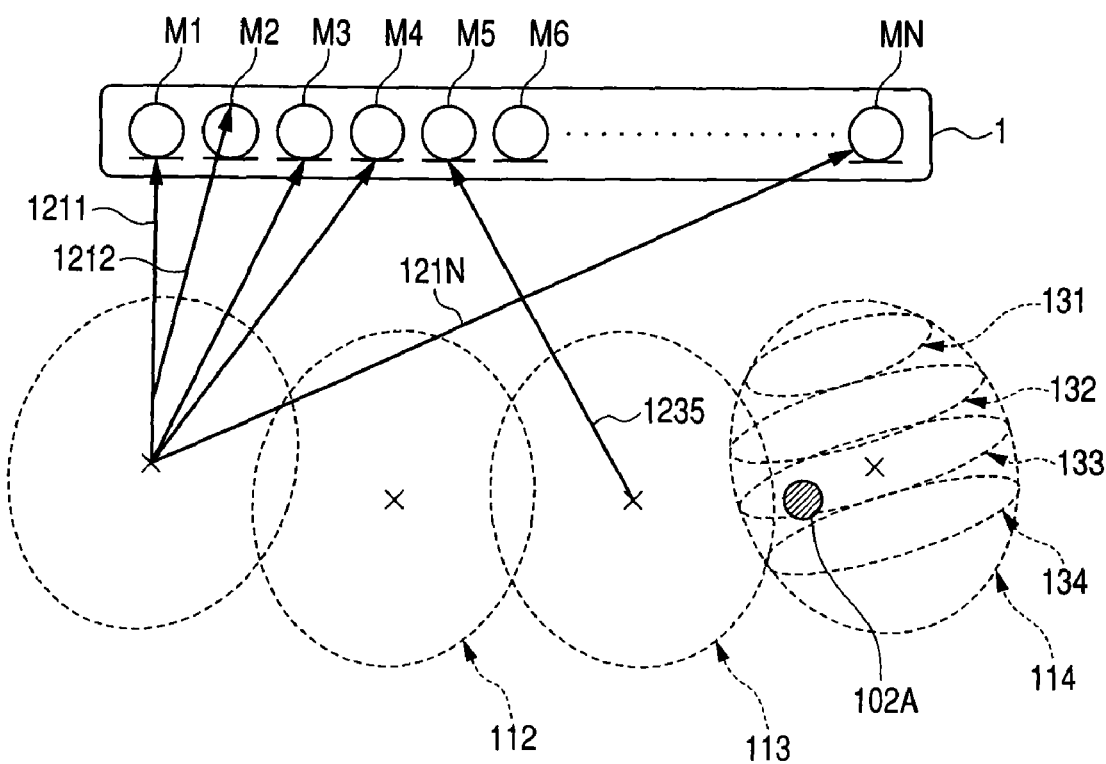
FIG. 5A is a schematic representation to determine the position of a speaker.
Figure 5B:
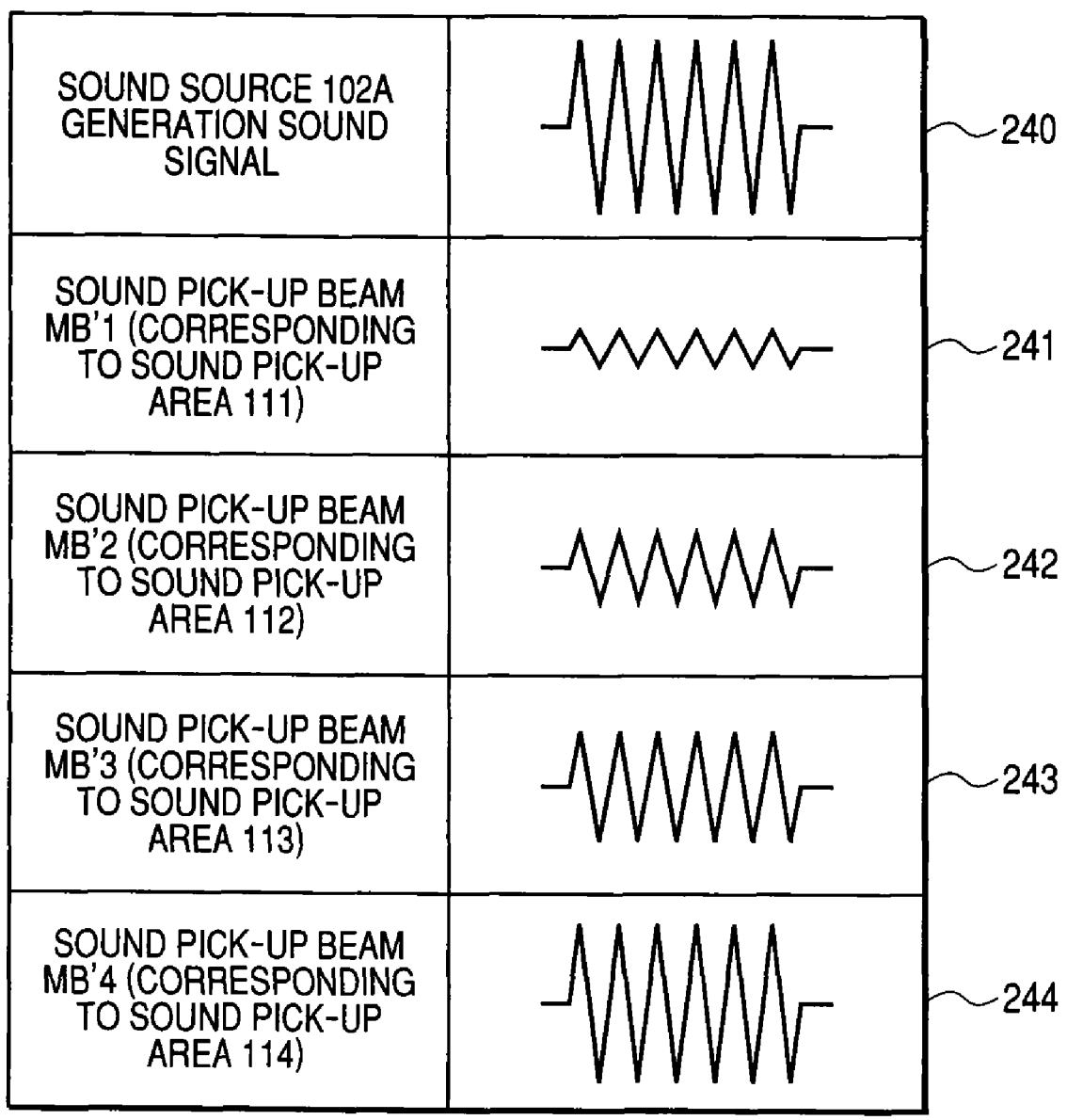
FIG. 5B is a schematic representation to determine the position of a speaker.

A search method for the position of a speaker executed in the transmitting unit 1A will be briefly discussed with reference to FIG. 5A (described later in detail with reference to FIGS. 5A and 5B). A detection beam forming section (corresponding to a detection beam forming section 21 in FIG. 2A described later) in the teleconferencing apparatus 1 forms sound pick-up beams directed to a plurality of sound pick-up areas 111 to 114 assumed to be the position of the speaker 102A at the transmitting party in accordance with the delay pattern as shown in FIG. 5A.

The sound pick-up beam is formed by adjusting the delay amount difference based on the distance difference from each microphone Mi (i=1 to N) so as to match the specific position and superposing a digital sound signal. Accordingly, the sound at the specific position is mutually strengthened and is input and sounds coming from other positions than the specific position cancel each other and directivity to the sound at the specific position is provided.

If any of the sound pick-up areas 111 to 114 and the position of the speaker 102A at the transmitting party match, the sound pick-up beam with the largest volume is obtained from among the sound pick-up beams. Then, the detection beam forming section in the teleconferencing apparatus 1 forms four sound pick-up beams directed to the sound pick-up areas 111 to 114 at the same time and searches for the direction in which the volume is large. An acquisition beam forming section (corresponding to an acquisition beam forming section 22 in FIG. 2A described later, which has a similar circuit configuration to that of the detection beam forming section) in the teleconferencing apparatus 1 sets fragmented areas 131 to 134 into which the direction in which the volume is large (the area 114 in FIG. 5A) thus obtained is further divided. The acquisition beam forming section also forms sound pick-up beams directed to the fragmented areas 131 to 134. The teleconferencing apparatus 1 selects the sound pick-up beam with a large volume from among the sound pick-up beams directed to the fragmented areas 131 to 134. Such a two-step search is made, whereby a search can be made precisely and rapidly for the position of the speaker 102A.

The beam forming section operates at all times or operates upon reception of a command from a beam position calculation section 24 at the time when the beam position calculation section 24 makes position detection at predetermined time intervals, for example, every 0.5 sec in the teleconferencing apparatus 1.

Figure 2A:
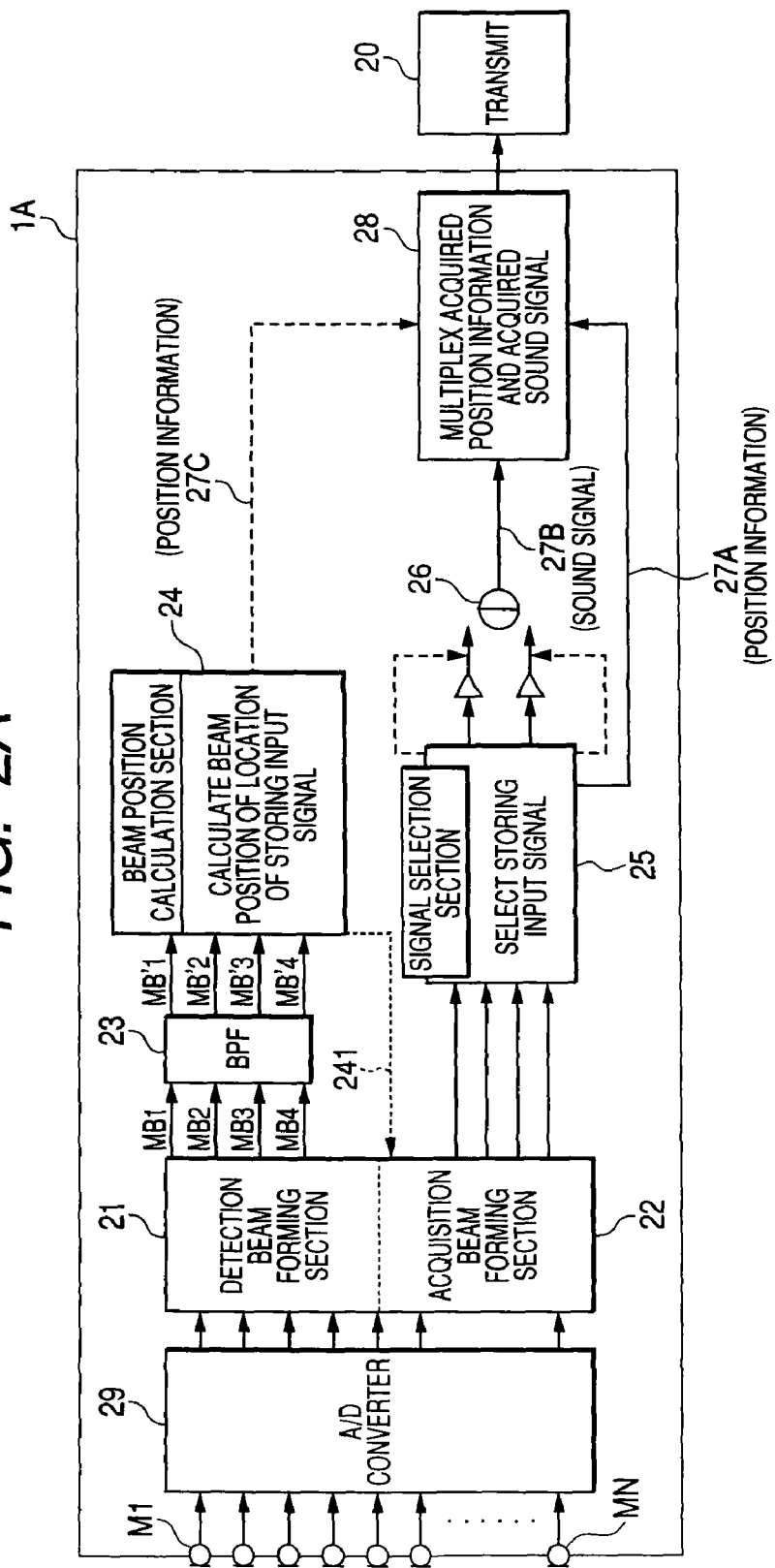
FIG. 2A is a block diagram of a transmitting party to represent the internal configuration of the teleconferencing apparatus used for voice communications of the embodiment of the invention.

Next, the internal configuration of the teleconferencing apparatus 1 will be discussed with FIGS. 2A and 2B. FIGS. 2A and 2B are block diagrams to represent the internal configuration.

To begin with, the configuration of the transmitting unit 1A will be discussed with FIG. 2A. The transmitting unit 1A includes the microphones Mi and an A/D converter 29 to digitally process picked-up sound. It also includes the detection beam forming section 21 for forming sound pick-up beams directed to a plurality of positions in front of the microphones assumed to be the presence of a speaker so as to be able to estimate the position at which the speaker speaks and output position information as a control signal 241, a BPF 23 (band-pass filter), and the beam position calculation section 24. The transmitting unit 1A also includes the acquisition beam forming section 22, a signal selection section 25, and a signal addition section 26 so as to be able to search for the proximity of the position calculated in the beam position calculation section 24 in more detail and form a sound pick-up beam directed to the position. It also includes a multiplexing section 28 for multiplexing position information 27A and the sound pick-up beam. The configurations of the components will be discussed below:

The microphones Mi (i=1 to N) in FIG. 2A are N microphones as shown in FIG. 1A for converting sound of the speaker 102A at the transmitting party into a sound signal.

The A/D converter 29, which can be implemented as an IC for A/D conversion, converts the sound signal acquired through the microphone Mi into a digital sound signal and sends the digital sound signal to the detection beam forming section 21 and the acquisition beam forming section 22.

The detection beam forming section 21 forms sound pick-up beams directed to the areas where a speaker is assumed to exist at the same time. Thus, for example, it includes ring buffer RAM or its equivalent for performing delay processing and adjusts the delay amount of the sound signal picked up in each microphone Mi. To perform the delay processing, the detection beam forming section 21 also includes ROM storing a control program of writing into and reading from the ring buffer RAM and delay control data. The beam forming section 21 also includes a calculation section for executing the program. The teleconferencing apparatus 1 is provided with a DSP for operating signal processing of the teleconferencing apparatus 1 and the calculation section of the detection beam forming section 21 is configured as one function of the DSP. Then, the detection beam forming section 21 in FIG. 2A assumes a plurality of positions of the speaker in front of the transmitting unit 1A, sets sound pick-up areas of sound pick-up beams, and forms sound pick-up beams directed to the positions, as described above.

In the description to follow, to distinguish the sound pick-up beam formed in the detection beam forming section 21 from the sound pick-up beam formed in the acquisition beam forming section 22, the latter sound pick-up beam is called acquisition beam.

The detection beam forming section 21 in FIG. 2A forms sound pick-up beams directed to sound pick-up areas (corresponding to 111 to 114 in FIG. 5A) to make a search in a rough range.

The acquisition beam forming section 22 includes a similar configuration to that of the detection beam forming section 21. However, the acquisition beam forming section 22 sets fragmented areas (the fragmented areas 131 to 134 in the sound pick-up area 114 in FIG. 5A) in a further fine range based on the calculation result of the beam position calculation section 24 for analyzing the sound pick-up beam of the detection beam forming section 21. The acquisition beam forming section 22 forms acquisition beams directed to the fragmented areas 131 to 134 and outputs the acquisition beams to the signal selection section 25. Thus, the detection beam forming section 21 and the acquisition beam forming section 22 form the sound pick-up beams and the acquisition beams stepwise finely and a search is made for the position of the speaker 102A at the transmitting party, so that the hardware configuration can be simplified, the calculation speed is increased, and response to variation in the position of the speaker 102A at the transmitting party can be speeded up as compared with the case where a fine search is made from the beginning.

The BPF 23 in FIG. 2A performs convolution of a filter for cutting any other band than the sound band required for detecting the speaker 102A at the transmitting party for sound pick-up beams MB1 to MB4 of the detection beam forming section 21, and outputs sound pick-up beams MB'1 to MB'4. Accordingly, the calculation amount can be reduced and a search made by the beam position calculation section 24 can be speeded up. Although the BPF 23 cuts such a band, no problem arises because the rough sound pick-up areas 111 to 114 are set in the detection beam forming section 21 described above.

The beam position calculation section 24 selects the pattern with the largest volume from among the pick-up beams MB'1 to MB'4 output from the BPF 23. Accordingly, the position of the speaker 102A at the transmitting party can be determined. The beam position calculation section 24 outputs the determined position information to the acquisition beam forming section as a control signal 241. Specifically, patterns of positions where the speaker 102A at the transmitting party is assumed to exist are provided with ID codes and the beam position calculation section 24 outputs the ID code of the position where the volume of the sound pick-up beam is large to the acquisition beam forming section 22.

Instead of calculating the volume in the beam position calculation section 24, digital time-series sound data can be FFTed and squares of gains for each specific frequency can be added up. The beam position calculation section 24 operates at predetermined time intervals, for example, every 0.5 sec. Accordingly, the beam position calculation section 24 can detect a move of the speaker 102A as the control signal 241.

Upon reception of the control signal 241 from the beam position calculation section 24, the acquisition beam forming section 22 in FIG. 2A forms acquisition beams directed to a plurality of (in the embodiment, four) sound pick-up areas into which the sound pick-up area corresponding to the sound pick-up beam with the largest volume from among the sound pick-up beams provided by the detection beam forming section 21 is further fragmented.

The signal selection section 25 selects two acquisition beams with a large volume (corresponding to fragmented sound pick-up areas 133 and 134 in FIG. 5A) among the acquisition beams output by the acquisition beam forming section 22, determines that the position determined by prorating in response to the volumes of the acquisition beams is the position 102A of the sound source, and outputs the position to the multiplexing section 28 as position information 27A.

The signal addition section 26 in FIG. 2A prorates and combines the two acquisition beams output by the signal selection section 25 in response to the volumes and sends a composite digital sound signal 27B to the multiplexing section 28. Two or more acquisition beams are thus always combined, whereby it is made possible to smoothly move sound even when the speaker moves or is changed.

The multiplexing section 28 in FIG. 2A multiplexes the position information 27A generated in the signal selection section 25 and the sound signal 27B generated in the signal addition section 26 and transmits 20 the resultant signal to the receiving unit 1B.

Next, the internal configuration of the receiving unit 1B will be discussed with FIG. 2B. The receiving unit 1B includes a reception section 31, a parameter calculation section 32, a virtual sound source generation signal processing section 33, a DAC $34i$ ($i=1$ to N), and AMP $35i$ ($i=1$ to N), and connects external loudspeakers SPi ($i=1$ to N). The configurations of the components will be discussed below:

The reception section 31 in FIG. 2B receives a reception signal 30 about the position information 27A and the sound signal 27B from the transmitting unit 1A. The sound signal 27B is sent to the virtual sound source generation signal processing section 33 and the position information 27A is sent to the parameter calculation section 32.

The parameter calculation section 32 sets a virtual sound source VS (see FIG. 1B) based on the position information 27A and calculates distance $36i$ ($i=1$ to N) from the position of the virtual sound source VS to the position of each loudspeaker SPi. The distance $36i$ is divided by the sound velocity, whereby a parameter of a delay amount is set.

The virtual sound source generation signal processing section 33, the DAC $34i$ ($i=1$ to N), and the AMP $35i$ ($i=1$ to N) in FIG. 2B will be discussed.

The virtual sound source generation signal processing section 33 performs signal processing of the sound received in the reception section 31, namely, the sound signal 27B generated in the multiplexing section 28 of the transmitting unit 1A for each output channel of the loudspeaker SPi ($i=1$ to N) based on the parameter set in the parameter calculation section 32, and outputs the signal to the DAC $34i$ ($i=1$ to N). Although the sound signal 27B input to the reception section 31 is one channel, delay processing is performed for the sound signal 27B for each output channel of the loudspeaker SPi based on the parameter (delay amount setting) in the parameter calculation section 32. Accordingly, a sound emission beam with the virtual sound source VS as the focus can be output from the loudspeaker SPi and auditory localization can be accomplished as if the virtual sound source existed in front of the receiving unit 1B.

The DAC $34i$ converts the sound digital data obtained in the virtual sound source generation signal processing section 33 into an analog signal and outputs the analog signal.

The AMP 35*i* (i=1 to N) amplifies the output of the DAC 34*i* (i=1 to N) and outputs the amplified signal to the loudspeaker SPi (i=1 to N).

A supplementary description on search refinement by the signal selection section 25 of the transmitting unit 1A is given. The signal selection section 25 may perform search refinement only if the acquisition beam forming section 22 determines that the speaker is getting still for a predetermined time, for example, because there may be no time allowance for performing search refinement because of a problem involved in the processing capability. In this case, generation processing of the sound signal 27B is performed below as in (A) or (B):

(A) If the position of the sound source remains in one of the roughly setup sound pick-up areas 111 to 114 for a specific time, the acquisition beam forming section 22 detects that the control signal 241 is constant for a predetermined time, and forms a plurality of acquisition beams directed to fragmented sound pick-up areas (corresponding to 133 and 134 in FIG. 5A) inside the sound pick-up area selected in the beam position calculation section 24.

(B) If the position of the sound source moves among the roughly setup sound pick-up areas 111 to 114, the acquisition beam forming section 22 detects variation in the control signal 241 and forms acquisition beams directed to the sound pick-up areas 111 to 114 set as a plurality of rough ranges as with the detection beam forming section 21. In this case, the acquisition beams are directed to the sound pick-up areas in rough ranges like the sound pick-up beams described above.

In either of (A) and (B), the signal selection section 25 selects two acquisition beams with a large volume among the acquisition beams output from the acquisition beam forming section 22 and outputs the acquisition beams to the signal addition section 26, which then prorates and combines the acquisition beams in response to the volumes.

If the sound source largely moves, the signal addition section 26 in FIG. 2A may fade out sound before switch and fade in sound after switch to cross-fade the sound rather than selects and simply combines two acquisition beams with a large volume. Thus, if the sound source largely moves, the sound can be connected naturally. While the cross fading is being performed, the interpolation position of the sound pick-up area 111 to 114 and the cross fading start time and end time are transferred between the transmitting unit 1A and the receiving unit 1B. About the position of the virtual sound source VS, a gradual move is made within the cross fading time and the parameter calculation section 32 sets a parameter based on the move. Accordingly, a move of a sound image becomes natural.

If the position of the sound source moves among the roughly setup sound pick-up areas 111 to 114, rough ranges are set in the acquisition beam forming section 22 as in the detection beam forming section 21. In this case, the position information 27A output by the signal selection section 25 becomes equal to the control information 241 of position information output by the beam position calculation section 24. Therefore, the control information 241 provided by the beam position calculation section 24 rather than the position information 27A output by the signal selection section 25 may be output to the multiplexing section 28 as 27C (see FIG. 2A).

Figures 3A, 3B:
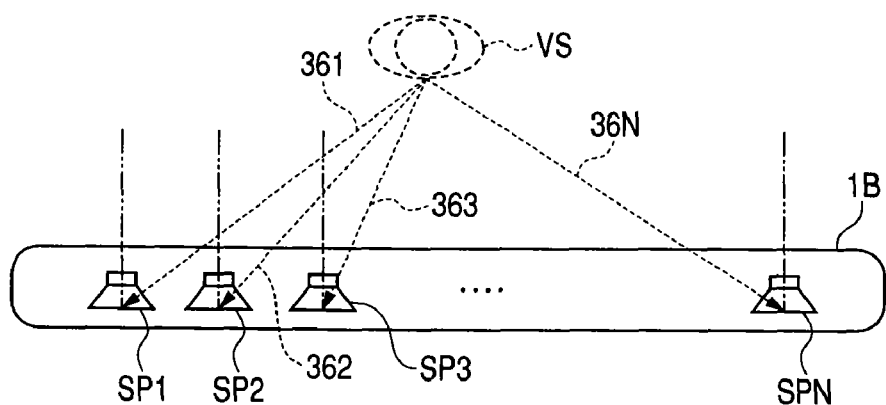
FIG. 3A is a conceptual drawing about a parameter setting method of a parameter calculation section 32.
FIG. 3B is a drawing (table) to describe the parameter setting method of the parameter calculation section 32.

A parameter setting method of the parameter calculation section 32 in FIG. 2B will be specifically discussed with FIGS. 3A and 3B. FIG. 3A is a conceptual drawing about the setting method.

To begin with, the distance 36*i* between the virtual sound source VS and each loudspeaker SPi of the receiving unit 1B is calculated as shown in FIG. 3A. Next, a parameter of the parameter calculation section 32 is set as shown in FIG. 3B. For example, for SP1, the value resulting from dividing distance 361 by sound velocity V is adopted.

As described above with FIGS. 2 and 3, without transmission through sound channels of the N microphones Mi at the transmission source, the receiving unit 1B can precisely reproduce a sound field on the loudspeaker SPi (i=1 to N) based only on the sound signal 27B and the position information 27A of the transmitting unit 1A.

<Example of Sound Pick-Up of Transmitting Unit>

Figure 4:
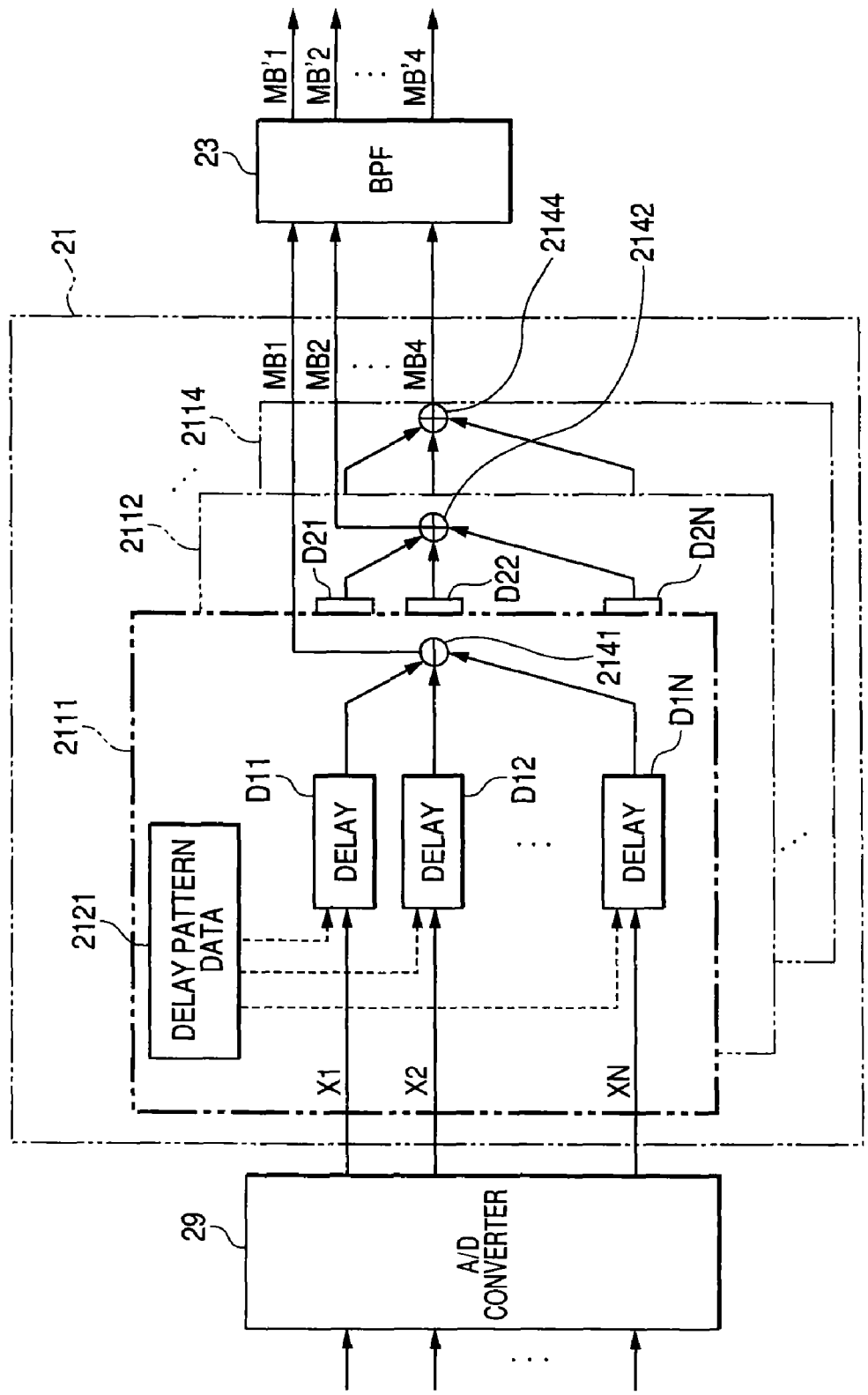
FIG. 4 is a drawing to show the internal configuration of a detection beam forming section the teleconferencing apparatus used for voice communications of the embodiment of the invention.

An example of sound pick-up about the detection beam forming section 21 described with FIG. 2A will be further specifically discussed with reference to FIGS. 4, 5A, and 5B.

A method of forming acquisition beams directed to the sound pick-up areas 111 to 114 by the detection beam forming section 21 will be discussed with FIG. 4. FIG. 4 shows virtual calculation tables 2111 to 2114 to describe a method of giving a delay to inputs of X1 to XN and adding the delays. To form the sound pick-up beams MB1 to MB4, a predetermined delay is given to inputs of X1 to XN and the delays are added. To direct sound pick-up beams to the sound pick-up areas, delay pattern data 2121 to 2124 are recorded in ROM not shown of the detection beam forming section 21 in association with the sound pick-up areas 111 to 114. The detection beam forming section 21 sets a delay amount in delay Dji (j=1 to 4, i=1 to N) based on the delay pattern data 2121 to 2124. Microphone input combining sections 2141 to 2144 add signals provided by passing inputs of delays X1 to XN through Dj1 to DjN for each of the calculation tables 2111 to 2114 and output the results as the sound pick-up beams MB1 to MB4.

In the description given above, the calculation tables 2111 to 2114 are shown in a one-to-one correspondence with the sound pick-up beams MB1 to MB4; on implementation, however, it is convenient to gather D11 to D41 and implement as memory for one ring buffer, etc. X1 is input to the ring buffer and output taps of D11 to D41 are provided. For D11 to D4*i* (i=2 to N), likewise, a ring buffer to which one Xi is input is formed and output taps of D1*i* to DKi are provided. On implementation, preferably the delay pattern data 2121 to 2124 are provided for each input Xi (i=1 to N) rather than for each sound pick-up beam MB1 to MB4.

Next, a detection method of a sound source position will be discussed with reference to FIG. 5A. The detection beam forming section 21 forms sound pick-up beams directed to the sound pick-up areas 111 to 114 at the same time. The beam position calculation section 24 compares the magnitudes of the volumes of the sound pick-up beams and checks which of the sound pick-up areas a speaker exists in.

In FIG. 5A, sound signals picked up by the microphones Mi (i=1 to N) are delayed by a proper delay time and are combined, thereby forming sound pick-up beams directed to the sound pick-up areas 111 to 114. A setting method of the delay time to be set in each microphone (namely, delay time for delaying sound picked up by each microphone) will be discussed. In the description given here, the sound pick-up beam converging to the sound pick-up area 111 is taken as an example. As shown in FIG. 5A, distance 121*i* (i=1 to N) from the center of the sound pick-up area 111 to the microphone Mi (i=1 to N) is calculated. This distance is divided by the sound velocity (340 m/sec) to calculate the propagation time of a sound wave from the sound pick-up area 111 to each microphone. The longest time of the calculated propagation times is adopted as the reference time and the difference between the reference time and the propagation time to each microphone is adopted as the delay time set in the microphone. The delay time is set in the detection beam forming section 21.

The sound signals picked up by the microphones are delayed according to the delay time thus set and are combined, whereby the sounds propagated from the sound pick-up area 111 to the microphones can be combined in phase with each other and the sound in the sound pick-up area 111 can be output with a high gain. On the other hand, the sounds propagated from other areas are combined in an out-of-phase state and thus the amplitudes are canceled and a low gain results.

Although the sound pick-up beam converging to the sound pick-up area 111 has been described, a similar description also applies to the sound pick-up beams converging to the sound pick-up areas 112, 113, and 114.

Next, the calculation method of the beam position calculation section 24 shown in FIG. 2A will be discussed more specifically with FIG. 5B. In the description to follow, it is assumed that a speaker at the transmitting party exists at a position of 102A (in the fragmented sound pick-up area 133 in the sound pick-up area 114) shown in FIG. 5A. It is also assumed that the waveform of a sound source generation signal is the form shown in reference numeral 240.

To begin with, the detection beam forming section 21 sets sound pick-up areas 111 to 114 and searches for the position of the speaker 102A at the transmitting party. If the speaker exists in 102A in FIG. 5A, the volume of a sound pick-up beam MB'4 directed to the sound pick-up area 114 becomes the largest. On the other hand, the volumes of pick-up beams directed to the sound pick-up areas 113, 112, and 111 away from the sound pick-up area 114 lessen as shown in waveform 243->waveform 242->waveform 241. Then, the beam position calculation section 24 selects the sound pick-up area corresponding to the sound pick-up beam with the largest volume among the sound pick-up beams MB'1 to MB'4 shown in FIG. 2A (in FIG. 5A, 114).

The signal selection section 25 selects and outputs acquisition beam output with the largest volume as with the beam position calculation section 24. However, the signal selection section 25 selects the two acquisition beams with the largest volume and the second largest volume in the fragmented sound pick-up areas 131 to 134 set by the acquisition beam forming section 22. The acquisition beams become the beams corresponding to the fragmented sound pick-up areas 133 and 134 in FIG. 5A.

According to the described configuration, the sound pick-up beam MBj directed to the sound pick-up area 11j as shown in FIG. 5A can be formed. The acquisition beam forming section 22 in FIG. 2A can also take a similar configuration.

<Specific Use Mode and Sound Field Reproduction Example>

Figure 6:
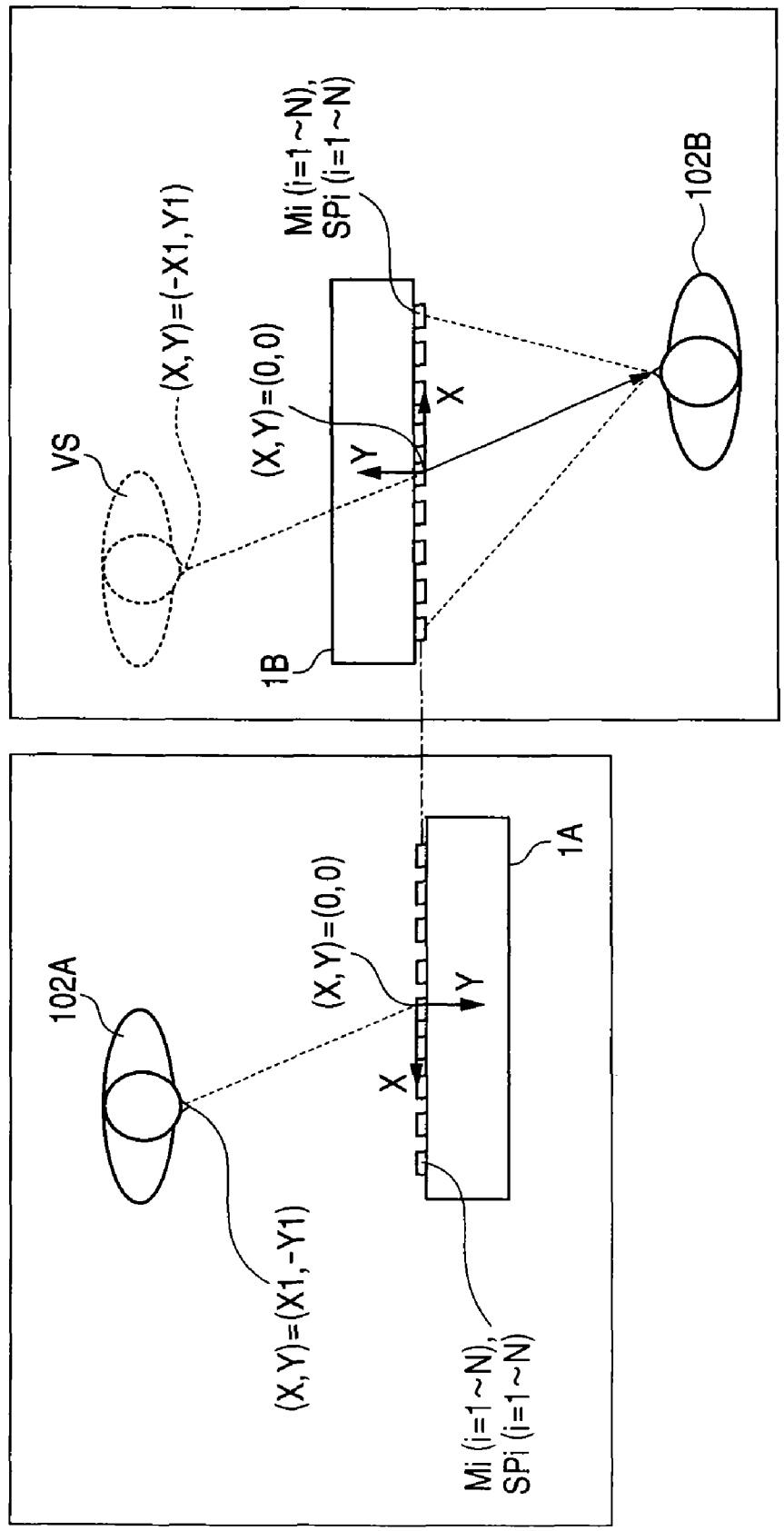
FIG. 6 is a drawing to describe a specific use mode and a sound field reproduction example.

A specific use mode and a sound field reproduction example of the apparatus of the embodiment will be discussed with FIG. 6. FIG. 6 is a drawing to represent the specific use mode. As described above with FIGS. 1A and 1B, the teleconferencing apparatus 1 includes the function of one apparatus to mutually connect through a communication line and a network and two or more equivalent teleconferencing apparatus are connected to each other through a network.

The transmitting unit 1A and the receiving unit 1B shown in FIG. 6 transmit and receive position information together with a sound signal and thus the sound field of a speaker 102A at the transmitting party can be transmitted without providing as many loudspeakers SPi or microphones Mi of one unit as the number of loudspeakers SPi or microphones Mi of the other. However, in the description to follow, the teleconferencing apparatus 1 of the same configuration are used. For simplicity, in the description to follow, two-dimensional coordinates of an XY plane are used and the center position of the transmitting unit 1A, the receiving unit 1B is the coordinates of the origin as shown in FIG. 6.

It is assumed that the X, Y coordinates of the speaker 102A at the transmitting party are (X1, -Y1). In the embodiment, the right of the transmitting unit 1A, the receiving unit 1B seen from the speaker is X plus direction (namely, the left direction of the plane of the drawing at the transmitting party in FIG. 6 and the right direction of the plane of the drawing at the receiving party in FIG. 6 are the X plus direction). The transmitting unit 1A of the teleconferencing apparatus 1 analyzes a sound signal emitted from the speaker 102A at the transmitting party and obtained with the microphone Mi and obtains position information of the speaker 102A at the transmitting party. The position information can be obtained by analyzing the sound signal of the microphone Mi (i=1 to N) as previously described with FIGS. 4, 5A, and 5B. In the description to follow with FIG. 6, it is assumed that the speaker 102A at the transmitting party exists at a plus position of the X axis of the speaker 102A at the transmitting party as a result of obtaining the position information.

As shown in FIG. 6, from the viewpoint of the listener 102B at the receiving party, it is natural for the listener 102B to converse with the speaker 102A at the transmitting party as they face each other. Thus, the value of the X coordinate of the position to set the virtual sound source VS in place of the speaker 102A at the transmitting party is -X1 at the left from the origin and the value of the Y coordinate is the rear on the depth side and thus becomes Y1. Consequently, the coordinates of the position to set the virtual sound source VS become (-X1, Y1). The parameter calculation section 32 in FIG. 2B calculates the parameters of the delay amount and the volume for each loudspeaker SPi (i=1 to N) based on the position of the virtual sound source VS as previously described with FIG. 3B. As shown in FIG. 2B, the parameters are set in the virtual sound source generation signal processing section 33 and the sound signal is passed through the DAC 34i (i=1 to N) and the AMP 35i (i=1 to N) and is output as sound from the loudspeaker SPi (i=1 to N).

A supplementary description to the embodiment described above is given below:

In the description given above, for simplicity, it is assumed that the transmitting unit 1A executes transmission, but the transmitting unit 1A, 1B is not a unit for executing only transmission or reception. The teleconferencing apparatus 1 includes a function of conducting bidirectional communications; it uses the receiving unit 1B to acquire spoken sound of the listener 102B at the receiving party and position information of the listener 102B at the receiving party, and transmits them to the transmitting unit 1A through the network. This function is similar to that described above.

In the description given above, it is assumed that only one speaker 102A at the transmitting party exists as one sound source, but two or more persons may exist. In this case, a plurality of pieces of position information are provided and the volume at each of the positions is detected and is transmitted. The receiving unit makes parameter setting as described above with FIG. 3B for each of the speakers and adds outputs of the loudspeakers SPi (i=1 to N) calculated based thereon for each unit.

In FIGS. 2A, 2B, 5A, and 5B, the numbers of the sound pick-up beams, the acquisition beams, and the sound pick-up areas output at the same time are each four, but may be more than or less than four. The numbers of the sound pick-up beams and the acquisition beams formed at the same time are not limited each to four. If a sound pick-up beam is output in a time-division manner rather than at the same time and the volumes are compared, the numbers of the sound pick-up beams and the acquisition beams may be each one rather than two or more.

To assume the case where two or more speakers exist, when such stepwise narrowing down of positions is performed, a plurality of candidates may be provided and a search may be further made for the proximities of the candidates at least at the initial stage without narrowing down the speaker positions to one.

In the description given above, the numbers of the loudspeakers SPi and the microphones Mi (i=1 to N) are the same N, but need not necessarily be made the same. Unlike the art as in patent document 2, sound source position information is used for transmission in the transmission passage and thus if the numbers differ, the sound field of the transmission source can be reproduced.

In the embodiment, the sound pick-up beams and the acquisition beams are set in two steps by the detection beam forming section 21 and the acquisition beam forming section 22 and a search is made for the speaker 102A at the transmitting party, but a search may be made by making narrowing down setting in three steps or more.

It is also possible for only the beam position calculation section 24 to detect and output position information 27C without providing the acquisition beam forming section 22. The beam position calculation section 24 can singly detect which of the sound pick-up areas 111 to 114 the sound source 102A is contained in if the sound pick-up beams are compared. The beam position calculation section 24 can simply find the acquisition beam with the largest volume without finding by prorating and can detect the position information 27C corresponding to the acquisition beam.

Further, in the description given above, the transmitting unit 1A in FIG. 2A transmits a sound pick-up beam or an acquisition beam as the sound signal 27B, but may simply transmit output of any of the microphones M1 to MN. Some or all of outputs of the microphones M1 to MN may be added up for transmission. In addition, any sound signal may be adopted if sound pick-up signals output by the microphones M1 to MN are added, etc., for use. Even in such a case, the receiving unit 1B would be able to precisely reproduce the sound field of the destination while suppressing consumption of the transmission line resources based on the position information 27A or 27C. However, to transmit a sound pick-up beam or an acquisition beam directed to the speaker 102A, the noise-resistant performance of the teleconferencing apparatus 1 more improves.

The invention claimed is:

1. A teleconferencing apparatus comprising:
a microphone array including a plurality of microphones, each configured to pick up sound and output a sound pick-up signal;
a sound pick-up beam forming section configured to delay and add the sound pick-up signals output from the microphones to form sound pick-up beams directed to a plurality of sound pick-up areas;
a position information detector configured to detect, as position information, the sound pick-up area corresponding to the sound pick-up beam showing the largest volume among the sound pick-up beams;
a transmitter configured to transmit the output of the sound pick-up signals of the microphones and the position information;
a loudspeaker array including a plurality of loudspeakers;
a reception section configured to receive the transmitted sound pick-up signals and position information from the transmitter; and
a signal processing section configured to process the received sound pick-up signals so as to form a sound emission beam with a virtual sound source position determined based on the received position information and to supply the processed sound pick-up signals to the loudspeakers,
wherein the signal processing section is configured to form the virtual sound source by setting a respective sound emission delay amount for each of the loudspeakers.

2. The teleconferencing apparatus as claimed in claim 1, wherein the position information detector is configured to detect the sound pick-up area of the sound pick-up beam showing the largest volume and thereafter form acquisition sound pick-up beams directed to a plurality of fragmented sound pick-up areas into which the sound pick-up area showing the largest volume is further fragmented, and to detect the position information based on the fragmented sound pick-up areas corresponding to a plurality of acquisition sound pick-up beams selected in a descending order of the volume values of the acquisition sound pick-up beams.

3. The teleconferencing apparatus as claimed in claim 2, wherein:
the position information detector is configured to detect the position information by prorating the fragmented sound pick-up areas corresponding to the acquisition sound pick-up beams selected in the descending order of the volume values of the acquisition sound pick-up beams in response to intensity of the selected acquisition sound pick-up beams, and
the signal processing section is configured to combine outputs of the selected acquisition sound pick-up beams by the prorating.

4. A teleconferencing apparatus comprising:
a microphone array including a plurality of microphones, each configured to pick up sound and output a sound pick-up signal;
a sound pick-up beam forming section configured to delay and add the sound pick-up signals output from the microphones to form sound pick-up beams directed to a plurality of sound pick-up areas;
a position information detector configured to detect, as position information, the sound pick-up area corresponding to the sound pick-up beam showing the largest volume among the sound pick-up beams, the position information configured to reproduce a virtual sound source position, represented in the output sound pick-up signals, in a loudspeaker array including a plurality of loudspeakers by associating a respective sound emission delay amount with each of the loudspeakers; and
a transmitter configured to transmit the output of the sound pick-up signals of the microphones and the position information.

5. The teleconferencing apparatus as claimed in claim 4, wherein the position information detector is configured to detect the sound pick-up area of the sound pick-up beam showing the largest volume and thereafter form acquisition sound pick-up beams directed to a plurality of fragmented sound pick-up areas into which the sound pick-up area showing the largest volume is further fragmented, and to detect the position information based on the fragmented sound pick-up areas corresponding to a plurality of acquisition sound pick-up beams selected in the descending order of the volume values of the acquisition sound pick-up beams.

6. The teleconferencing apparatus as claimed in claim 5, wherein the position information detector is configured to detect the position information by prorating the fragmented sound pick-up areas corresponding to the acquisition sound pick-up beams selected in the descending order of the volume values of the acquisition sound pick-up beams in response to the intensity of the selected acquisition sound pick-up beams.

\* \* \* \* \*